United States Patent
Koike et al.

(10) Patent No.: US 6,861,133 B2
(45) Date of Patent: Mar. 1, 2005

(54) COMPOSITE MOLDING

(75) Inventors: Takashi Koike, Gunma (JP); Kouji Akasaka, Gunma (JP)

(73) Assignee: Moriroku Kabushiki Kaisha, Tokyo (JP)

(*) Notice: Subject to any disclaimer, the term of this patent is extended or adjusted under 35 U.S.C. 154(b) by 23 days.

(21) Appl. No.: 09/978,774

(22) Filed: Oct. 18, 2001

(65) Prior Publication Data

US 2002/0061383 A1 May 23, 2002

(30) Foreign Application Priority Data

Oct. 19, 2000 (JP) .......................................... 2000-319160

(51) Int. Cl.$^7$ .............................. B32B 5/20; B32B 3/14
(52) U.S. Cl. ................................ 428/318.8; 428/318.6; 428/319.3; 428/68; 428/71; 428/76; 428/77; 428/78
(58) Field of Search ................................ 428/76, 319.3, 428/77, 71, 68, 318.6, 318.8, 78

(56) References Cited

U.S. PATENT DOCUMENTS

| | | | | |
|---|---|---|---|---|
| 3,767,742 A | * | 10/1973 | Robin | 264/45.2 |
| 3,958,053 A | * | 5/1976 | Ryan | 428/159 |
| 5,897,936 A | * | 4/1999 | Havens | 428/57 |
| 5,922,431 A | * | 7/1999 | Funato et al. | 428/71 |
| 6,106,043 A | * | 8/2000 | Izumo | 296/37.12 |
| 6,110,312 A | * | 8/2000 | Arnold et al. | 156/204 |

FOREIGN PATENT DOCUMENTS

JP   6-293039   10/1994

OTHER PUBLICATIONS

Translation of JP 05–220757, Furuya Nobuo, Aug. 31, 1993, 9 pages.*

* cited by examiner

Primary Examiner—Terrel Morris
Assistant Examiner—Hai Vo
(74) Attorney, Agent, or Firm—Arent Fox, PLLC

(57) ABSTRACT

A composite molding is formed by welding and joining a foam to a substrate made of a synthetic resin, the foam including a hard skin layer and a foamed layer formed by foaming a foamable synthetic resin in an unhardened state within the skin layer as the pressure of a cavity is decreased, wherein the skin layer includes a cover covering the foamed layer and a collar projecting outward from the edge of the cover on the substrate side while being directly welded and joined to the surface of the substrate. Therefore, the edge of the skin layer on the substrate side can be adequately hardened, thereby enabling adequate formation of the foamed layer and adequate welding between the foam and the substrate.

2 Claims, 9 Drawing Sheets

COMPOSITE MOLDING

BACKGROUND OF THE INVENTION

1. Field of the Invention

The present invention relates to a composite molding and, in particular, to an improvement in a composite molding that is formed by welding and joining a foam, which comprises a hard skin layer formed by cooling and hardening a foamable synthetic resin by contact with that part of a mold facing a cavity and a foamed layer formed by the foamable synthetic resin in an unhardened state within the skin layer foaming as the pressure of the cavity is decreased, to one surface of a substrate made of a synthetic resin, the surface facing the cavity.

2. Description of the Related Art

A composite molding formed by welding and joining a foam to a substrate is known in, for example, Japanese Patent Application Laid-open No. 6-293039.

When forming a composite molding by welding and joining a foam having a foamed layer within a skin layer to a substrate, as shown in FIG. 9, a cavity 17' is formed within a mold device, a part of one surface of a substrate 7 facing the cavity 17', a foamable thermoplastic synthetic resin is injected into the cavity 17', a hard skin layer 12' is formed by cooling and solidifying portions of the foamable thermoplastic synthetic resin that are in contact with molds 15' and 16, and one mold 16 is moved so as to increase the capacity of the cavity 17' and thereby reduce its pressure, which allows the unhardened synthetic resin within the skin layer 12' to foam, thus forming a foamed layer 13' to give a foam 8' having the foamed layer 13' within the skin layer 12'. A composite molding 9" in which the foam 8' is welded and joined to the surface of the substrate 7 is thus obtained.

During the course of forming the skin layer 12' by cooling and solidifying a part of the foamable thermoplastic synthetic resin, the cooling rate of the portion of the thermoplastic synthetic resin that is in contact with the substrate 7 is lower than the cooling rate of the portion thereof that is in contact with the mold 15', and there is therefore a possibility that formation of the skin layer 12' in the portion that is in contact with the substrate 7 might be inadequate. When forming the foamed layer 13', the portion on the substrate 7 side that is to form the skin layer 12' is not hardened adequately, and a foaming gas generated as the unhardened resin foams escapes through the interface between the unhardened portion and the substrate 7 thus raising the possibility that the foamed layer 13' might not be formed adequately. Furthermore, in a state in which the portion, on the substrate 7 side, that is to form the skin layer 12' is not hardened adequately, the foam 8' and the substrate 7 are welded and joined only via the foamed layer 13', and there is the possibility that the strength of the welding between the foam 8' and the substrate 7 might be degraded thus causing peel off.

SUMMARY OF THE INVENTION

The present invention has been carried out in view of the above-mentioned circumstances, and it is an object of the present invention to provide a composite molding that enables adequate formation of a foamed layer and adequate welding between a foam and a substrate by adequately hardening the edge of a skin layer on the substrate side.

In order to achieve the above-mentioned object, in accordance with a first aspect of the present invention, there is proposed a composite molding formed by welding and joining a foam to one surface of a substrate made of a synthetic resin, the surface facing the cavity, the foam comprising a hard skin layer formed by cooling and hardening a foamable synthetic resin by contact with that part of a mold facing a cavity and a foamed layer formed by foaming the foamable synthetic resin in an unhardened state within the skin layer as the pressure of the cavity is decreased, wherein the skin layer comprises a cover covering the foamed layer and a collar projecting outward from the edge of the cover on the substrate side while being directly welded and joined to the surface of the substrate.

In accordance with the above-mentioned arrangement of the first aspect, since the part of the skin layer on the substrate side, that is to say, the collar, is in contact with the mold over an adequate contact area on the side opposite to the substrate, the part of the skin layer on the substrate side can be adequately cooled and hardened. Consequently, when forming the foamed layer, the collar, which has been adequately hardened, welded and joined to the substrate, functions as a seal thus preventing the foaming gas from escaping, and the foamed layer is adequately formed. Moreover, since the collar is welded to the substrate over a comparatively wide area, the welding strength between the foam and the substrate can be adequately enhanced.

Furthermore, in order to achieve the above-mentioned object, in accordance with a second aspect of the present invention, there is proposed a composite molding formed by welding and joining a foam, which comprises a hard skin layer formed by cooling and hardening a foamable synthetic resin by contact with that part of a mold facing a cavity and a foamed layer formed by the foamable synthetic resin in an unhardened state within the skin layer foaming as the pressure of the cavity is decreased, to one surface of a substrate made of a synthetic resin, the surface facing the cavity, wherein a rib that is in contact with an inner face of the edge, on the substrate side, of the skin layer formed so as to cover the foamed layer is projectingly provided on the surface of the substrate.

In accordance with the above-mentioned arrangement of the second aspect, it is possible to suppress the transmission of heat from the unfoamed molten synthetic resin having a large amount of heat to the part of the skin layer that is in contact with the rib, that is to say, the edge of the skin layer on the substrate side, and the edge of the skin layer on the substrate side can be adequately cooled and hardened. Consequently, when forming the foamed layer, the edge of the skin layer on the substrate side is adequately hardened, welded and joined to the substrate, the foaming gas is prevented from escaping through the gap between the skin layer and the substrate, and the foamed layer can be adequately formed. Moreover, since the edge of the skin layer on the substrate side is adequately cooled and hardened, the foam and the substrate can be welded with adequate strength.

The above-mentioned objects, other objects, characteristics and advantages of the present invention will become apparent from an explanation of preferred embodiments that will be described in detail below by reference to the attached drawings.

BRIEF DESCRIPTION OF THE DRAWINGS

FIG. 1 is an exploded perspective view of a glove box.

FIG. 2 is a cross section at line 2—2 in FIG. 1.

FIG. 3 is a partial longitudinal cross section of a mold device with a synthetic resin injected into it.

FIG. 4 is a partial longitudinal cross section of the mold device at a time when formation of a composite molding is completed.

FIG. 5 is a longitudinal cross section of a composite molding.

FIG. 6 is a perspective view of a lid member from one surface side thereof.

FIG. 7 is a partial longitudinal cross section of a mold device with a synthetic resin injected into it.

FIG. 8 is a partial longitudinal cross section of the mold device at a time when formation of a composite molding is completed.

DESCRIPTION OF PREFERRED EMBODIMENTS

Figure 1:
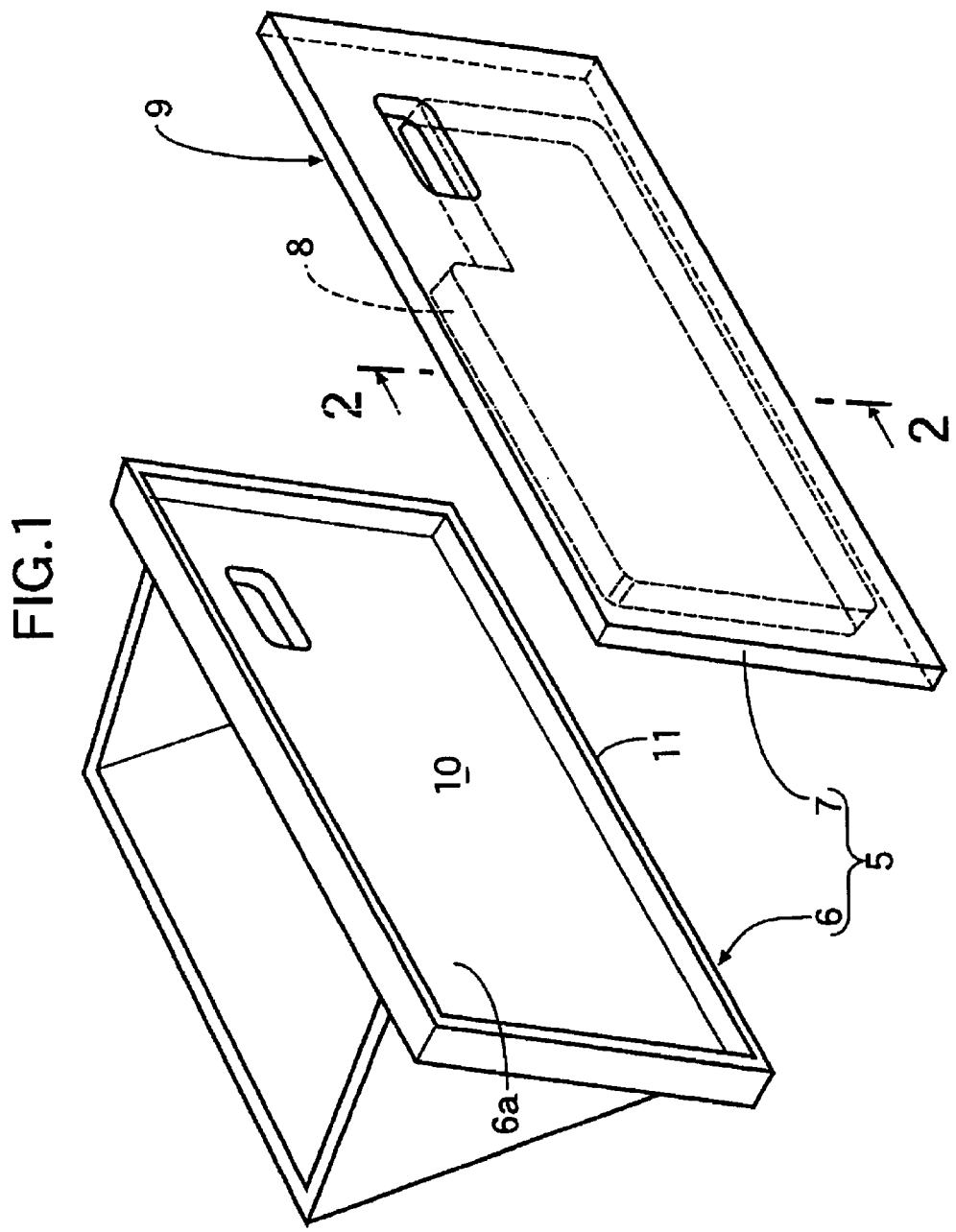
FIGS. 1 to 4 illustrate a first embodiment of the present invention.

Referring to FIGS. 1 to 4, a first embodiment of the present invention is explained below. In FIG. 1, a glove box 5 mounted in an instrument panel (not illustrated) of a vehicle has an arrangement in which a box member 6 and a lid member 7 as a substrate are joined together by vibration welding, etc. A composite molding 9 forming a part of the glove box 5 is formed by integrating a foam 8 with the lid member 7.

The foam 8 absorbs the impact generated when the knees of an occupant of the vehicle are involved in a secondary collision with the glove box 5 of the instrument panel, and the glove box 5 functions as a knee bolster.

The box member 6 is made of a synthetic resin in the form of a box opening upward having, as one of its walls, a rectangular opposing wall 6a that opposes the lid member 7. On the periphery of the opposing wall 6a is provided an integral joining wall part 11 projecting on the lid member 7 side and forming, together with the opposing wall 6a, a recess 10 opening on the lid member 7 side. The lid member 7 is also made of a synthetic resin, and the periphery of the lid member 7 is joined to the joining wall part 11.

Figure 2:
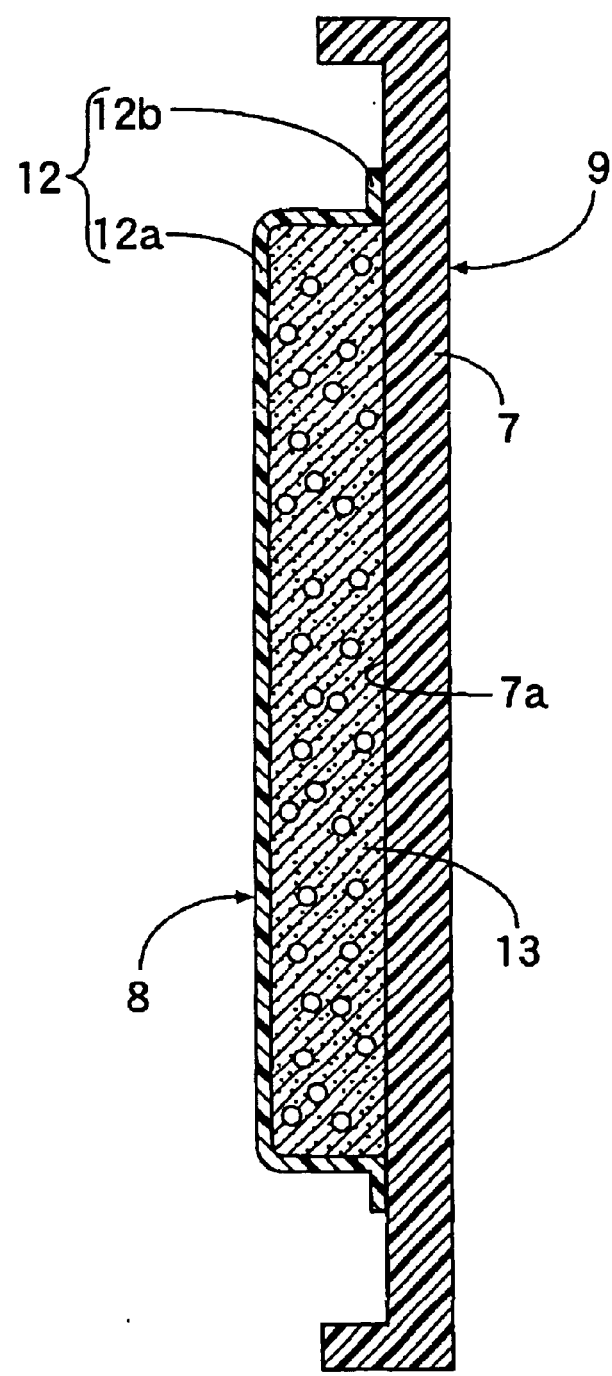

In FIG. 2, the foam 8 is formed from a hard skin layer 12 and a foamed layer 13 within it, and is interposed between the opposing wall 6a of the box member 6 and the lid member 7 so as to be housed in the recess 10.

The skin layer 12 is formed from a cover 12a covering the foamed layer 13 and a collar 12b projecting outward from the edge of the cover 12a on the lid member 7 side, the collar 12b being directly welded and joined to one surface 7a of the lid member 7.

Figure 3:
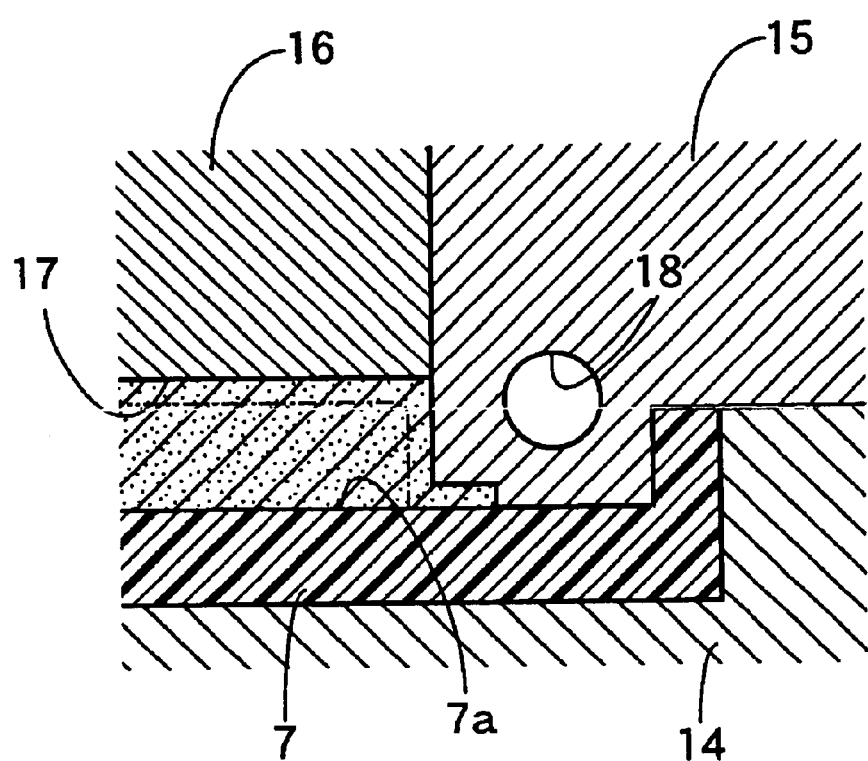

A mold device used for the molding of the foam 8, as shown in FIG. 3, has first and second molds 14 and 15 supporting the premolded lid member 7, so that the first and second molds 14 and 15 can approach or depart from each other, and a third mold 16 slidably supported in the second mold 15. A cavity 17 is defined by the second and third molds 15 and 16 and a part of the lid member 7 supported by the first and second molds 14 and 15. In the second mold 15 is formed a cooling water passage 18 for cooling a part of the second mold 15 that faces the cavity 17 so as to form the skin layer 12.

When forming the composite molding 9 using such a mold device, as shown in FIG. 3, a molten foamable synthetic resin is injected into the cavity 17 having a reduced capacity, and the surface of the molten synthetic resin is cooled and hardened by means of the parts of the mold device that define the cavity 17, that is to say, the surface that is in contact with the second and third molds 15 and 16 is cooled and hardened while maintaining the pressure within the mold device so that the molten resin does not foam. The skin layer 12 is thereby formed.

Figure 4:
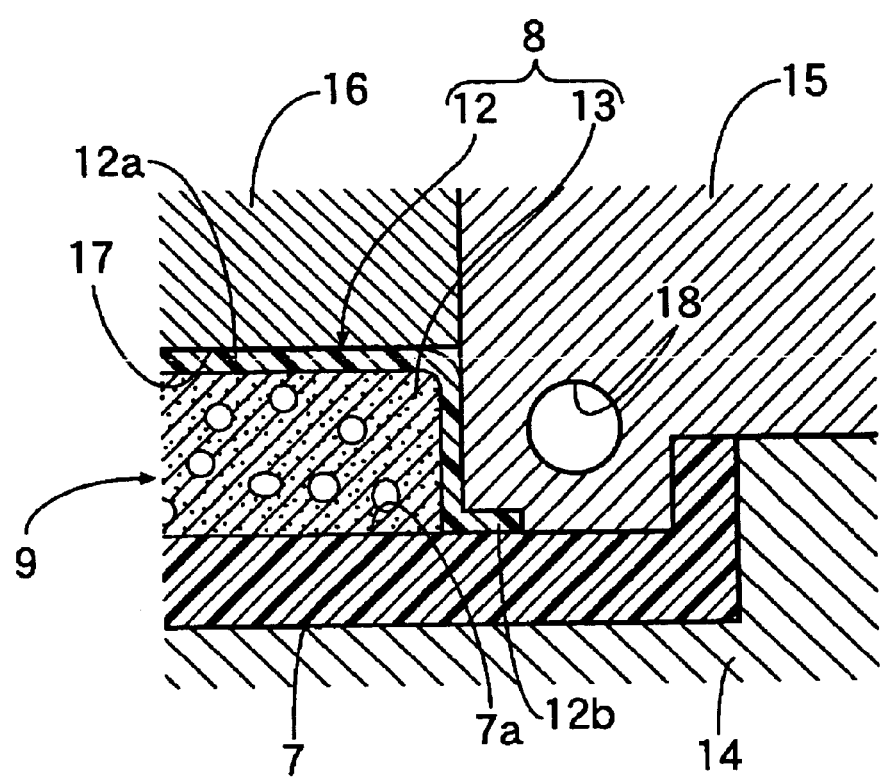

Subsequently, as shown in FIG. 4, sliding the third mold 16 so as to increase the capacity of the cavity 17 allows the molten foamable synthetic resin remaining unhardened within the skin layer 12 to foam in response to a decrease in the pressure of the cavity 17 thus forming the foam 8 having the foamed layer 13 within the skin layer 12. The completed foam 8, which has been formed after an adequate foaming and cooling time, is welded and joined to the surface 7a of the lid member 7 thus completing the formation of the composite molding 9.

The action of the first embodiment is now explained. The skin layer 12 of the foam 8 which forms, together with the lid member 7, the composite molding 9 is formed from the cover 12a covering the foamed layer 13 and the collar 12b projecting outward from the edge of the cover 12a on the lid member 7 side with the collar 12b being directly welded and joined to the surface 7a of the lid member 7. The part of the skin layer 12 on the lid member 7 side, that is to say the collar 12b, is in contact with the second mold 15 over an adequate contact area on the side opposite to the lid member 7 as shown in FIG. 3. It is therefore possible to adequately cool and harden the part of the skin layer 12 on the lid member 7 side, that is to say, the collar 12b.

When forming the foamed layer 13, the collar 12b that has been adequately hardened and welded and joined to the lid member 7 functions as a seal, thus preventing the foaming gas from escaping so as to adequately form the foamed layer 13.

Moreover, since the collar 12b is welded and joined to the lid member 7 over a comparatively wide area, the composite molding 9 can be formed with a high degree of welding strength between the foam 8 and the lid member 7.

Figure 5:
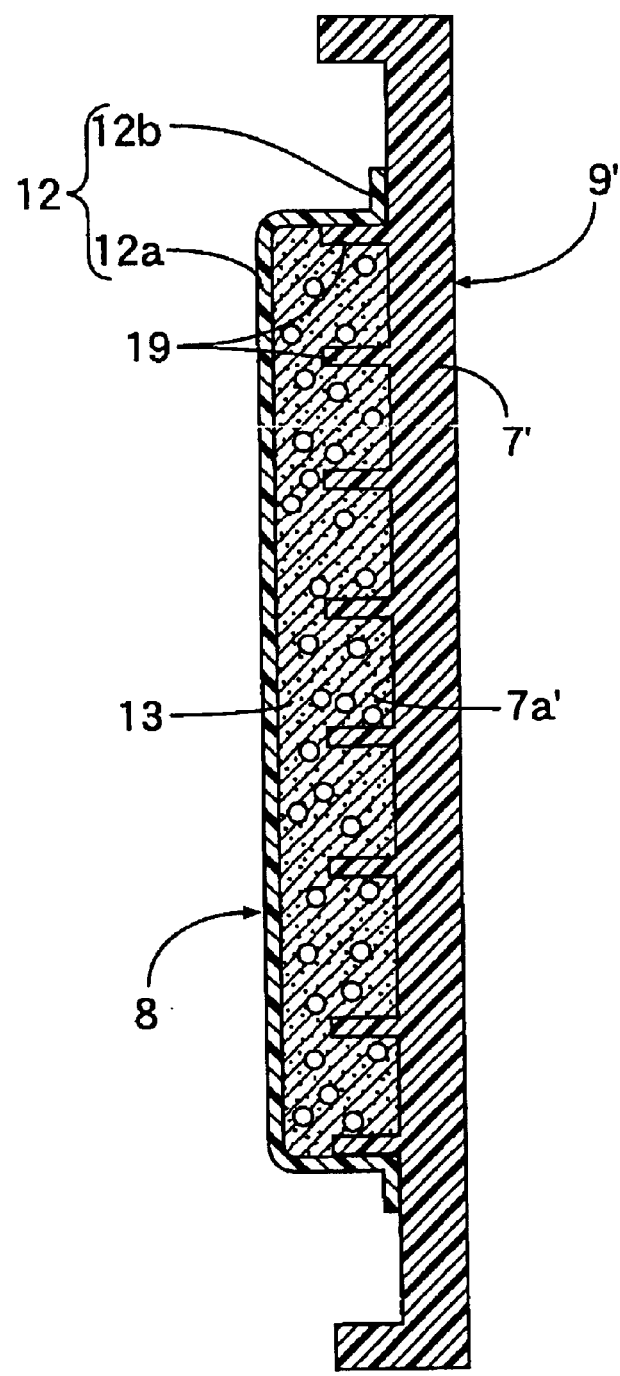
FIGS. 5 to 8 illustrate a second embodiment of the present invention.

Referring to FIGS. 5 to 8, a second embodiment of the present invention is now explained. In FIG. 5 a composite molding 9' is formed from a lid member 7' made of a synthetic resin as a substrate and a foam 8, which is welded and joined to one surface 7a' of the lid member 7'. The foam 8, which is basically the same as that in the above-mentioned first embodiment, has a foamed layer 13 formed within a hard skin layer 12. The skin layer 12 is formed from a cover 12a covering the foamed layer 13 and a collar 12b projecting outward from the edge of the cover 12a on the lid member 7 side with the collar 12b being directly welded and joined to the surface 7a' of the lid member 7'.

Figure 6:
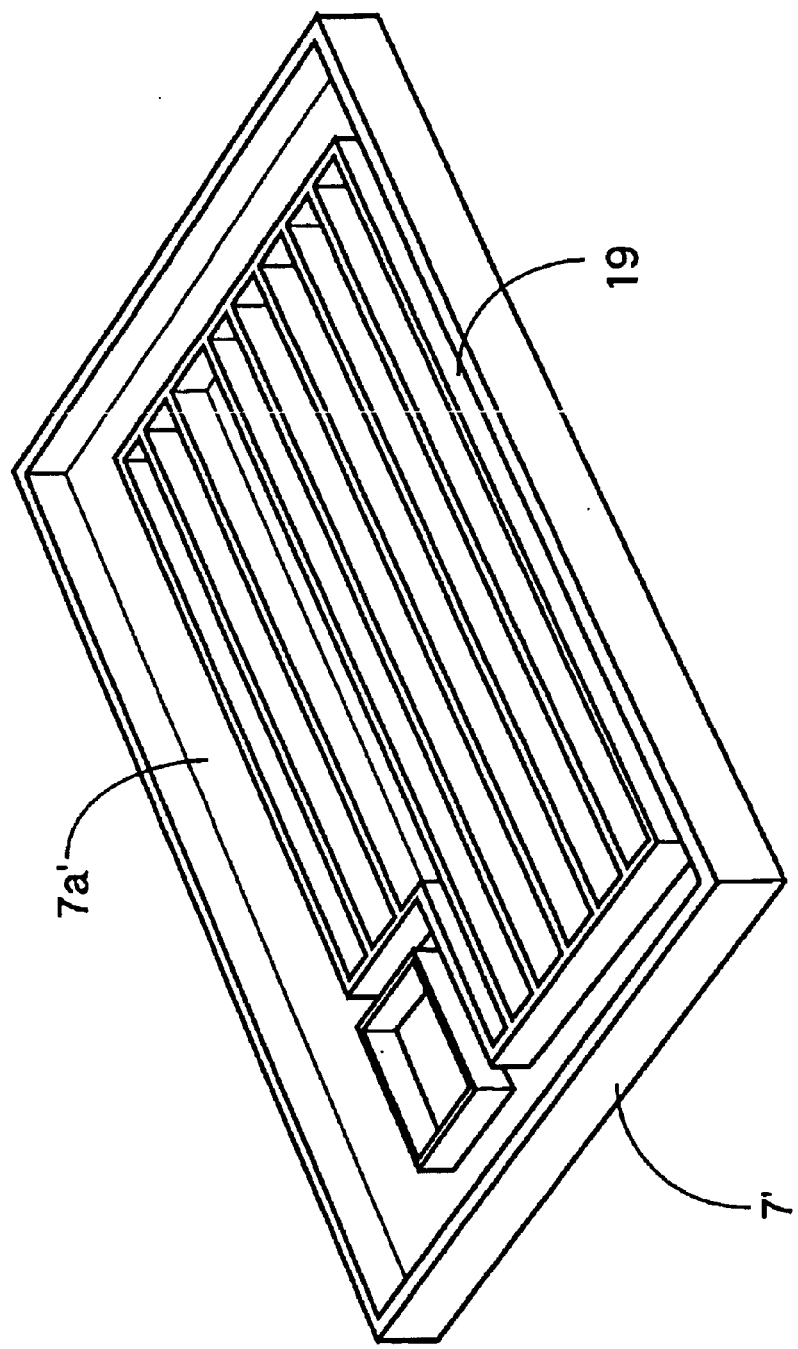

Referring also to FIG. 6, on the surface 7a' of the lid member 7' are disposed integral projecting ribs 19. These ribs 19 are formed so as to be in contact with the inner face of the edge of the cover 12a of the skin layer 12 on the lid member 7' side.

Figure 7:
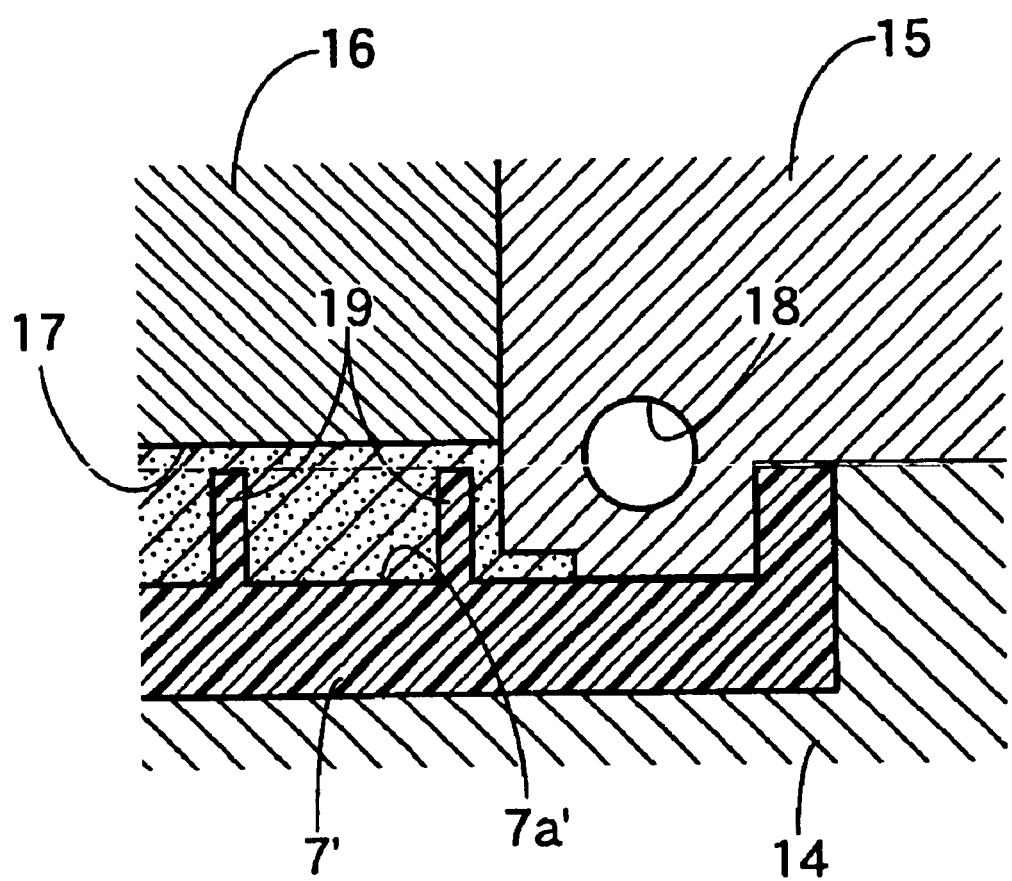

Such a composite molding 9' is formed using a mold device similar to that used in the above-mentioned first embodiment. As shown in FIG. 7, a molten foamable synthetic resin is injected into a cavity 17 having a reduced capacity, and the surface of the molten synthetic resin that is in contact with the second and third molds 15 and 16 is cooled and hardened while maintaining the pressure within the mold device so that the molten resin does not foam. The skin layer 12 is thereby formed.

Figure 8:
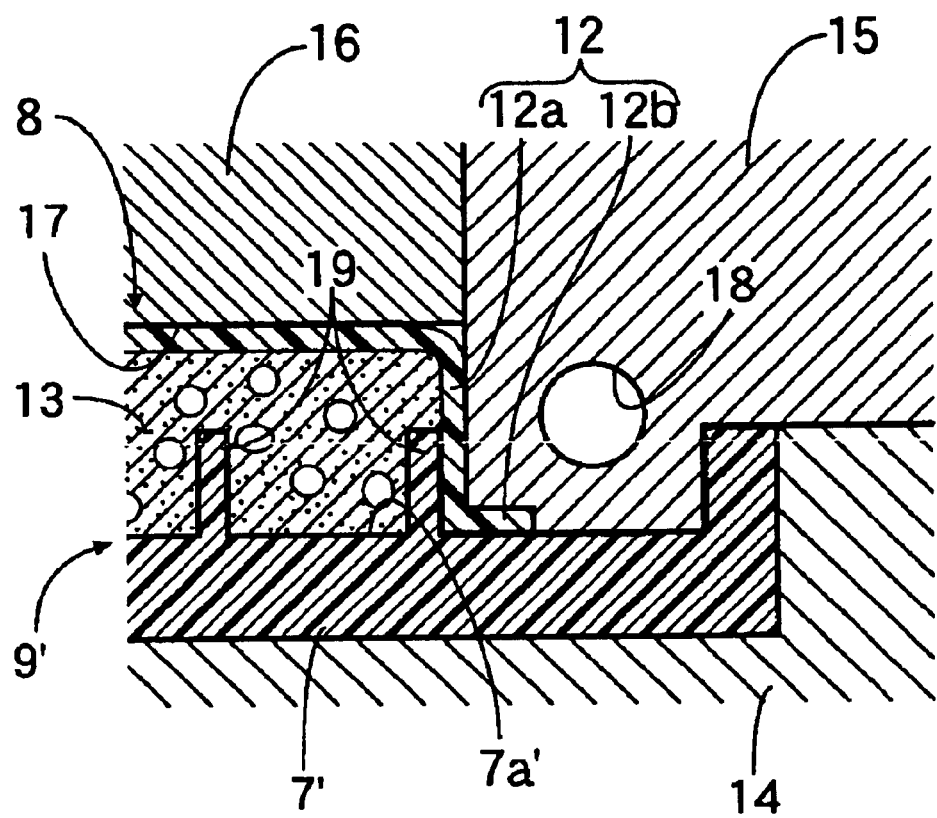
Figure 9:
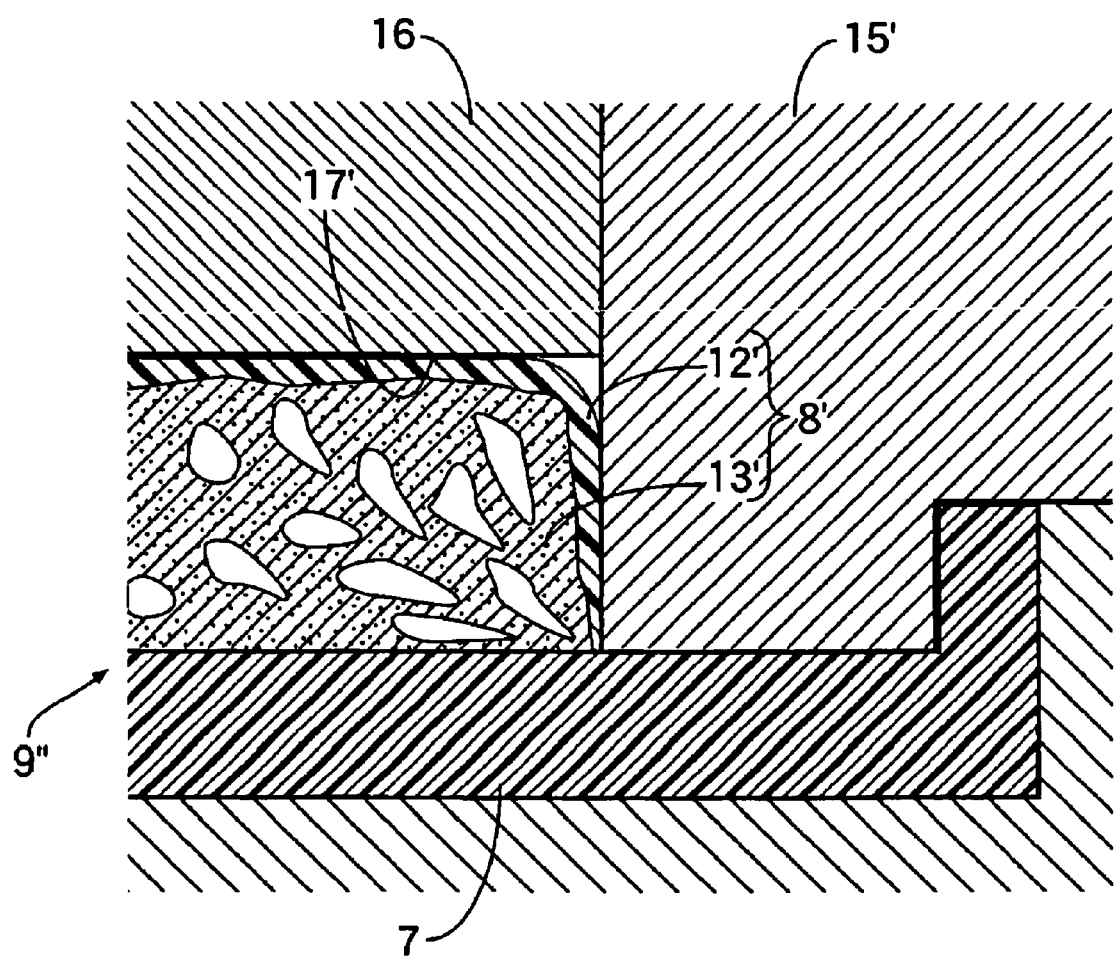
FIG. 9 is a partial longitudinal cross section of a conventional mold device at a time when formation of a composite molding is completed.

Subsequently, as shown in FIG. 8, sliding the third mold 16 so as to increase the capacity of the cavity 17 allows the molten foamable synthetic resin remaining unhardened within the skin layer 12 to foam in response to a decrease in the pressure of the cavity 17 thus forming the foam 8 having the foamed layer 13 within the skin layer 12. The completed foam 8, which has been formed after an adequate foaming and cooling time, is welded and joined to the surface 7a' of the lid member 7' and the ribs 19 integrally provided on the lid member 7' are in contact with the inner face of the edge of the cover 12a of the skin layer 12 on the lid member 7' side thus completing formation of the composite molding 9'.

In accordance with the second embodiment, in the part of the skin layer 12 that is in contact with the ribs 19 it is possible to suppress the transmission of heat to the skin layer 12 from the unfoamed molten synthetic resin that has a large amount of heat. In other words, since the ribs 19 are in contact with the inner face of the edge of the cover 12a of the skin layer 12 on the lid member 7' side, transmission of the heat from the molten synthetic resin to the inner face of the edge of the cover 12a on the lid member 7' side can be suppressed, and it is therefore possible to reliably cool and harden the collar 12b projecting from the edge of the cover 12a on the lid member 7' side.

As a result, the foamed layer 13 can be formed more adequately, and the welding strength between the foam 8 and the lid member 7' can be adequately enhanced.

In the above-mentioned second embodiment, the skin layer 12 is formed so as to integrally have the cover part 12a and the collar 12b, but the skin layer can be formed, without the collar 12b, so as to cover the foamed layer 13. The skin layer having such an arrangement can also form the foamed layer 13 more adequately by appropriately cooling and hardening the edge of the skin layer on the lid member 7' side, which is in contact with the ribs 19 of the lid member 7'. Consequently, the foam 8 and the lid member 7' can be welded together with adequate strength.

Although embodiments of the present invention have been explained in detail above, the present invention is in no way limited by the above-mentioned embodiments and can be modified in a variety of ways without departing from the spirit and scope of the present invention described in the appended claims.

What is claimed is:

1. A composite molding formed by welding and joining a foam to one surface of a substrate made of a synthetic resin, the surface facing a cavity, the foam comprising a hard skin layer formed by cooling and hardening a foamable synthetic resin by contact with parts of molds facing the cavity and a foamed layer formed by the foamable synthetic resin in an unhardened state within the skin layer foaming as the pressure of the cavity is decreased, wherein the skin layer comprises:

a cover covering the foamed layer; and a collar of a sheet shape having a predetermined width formed simultaneously with the cover and projecting outward from the edge of the cover on the substrate side while being placed in surface contact with, directly welded and joined to the surface of the substrate so as to seal said foamed layer from an outside environment.

2. A composite molding formed by welding and joining a foam to one surface of a substrate made of a synthetic resin, the surface facing the cavity, the foam comprising a hard skin layer formed by cooling and hardening a foamable synthetic resin by contact with parts of molds facing a cavity and a foamed layer formed by the foamable synthetic resin in an unhardened state within the skin layer foaming as the pressure of the cavity is decreased, wherein the substrate comprises;

a rib that is in contact with an inner face of the edge, on the substrate side, of the skin layer formed so as to cover the foamed layer, the rib being projectingly provided on the surface of the substrate.

* * * * *